United States Patent [19]

Figone

[11] 4,426,755
[45] Jan. 24, 1984

[54] QUICK RELEASE GIRTH BAND

[75] Inventor: Frank M. Figone, San Bruno, Calif.

[73] Assignee: Westinghouse Electric Corp., Pittsburgh, Pa.

[21] Appl. No.: 290,470

[22] Filed: Aug. 5, 1981

[51] Int. Cl.$^3$ ............................................. B65D 63/10
[52] U.S. Cl. ......................................... 24/28; 24/574; 24/663
[58] Field of Search .......... 24/26, 28, 201 TR, 221 R, 24/221 K, 115 F; 403/305, 306, 343

[56] References Cited

U.S. PATENT DOCUMENTS

| | | | |
|---|---|---|---|
| 1,579,494 | 4/1926 | Simons | 403/305 X |
| 2,465,783 | 3/1949 | Beaty | 403/305 X |
| 2,602,831 | 7/1952 | Levitt | 403/305 X |
| 3,456,967 | 7/1969 | Tantlinger et al. | 24/221 R X |
| 3,850,535 | 11/1974 | Howlett et al. | 403/305 |
| 4,184,232 | 1/1980 | Marosy | 24/221 R X |

*Primary Examiner*—Robert P. Swiatek
*Attorney, Agent, or Firm*—F. J. Baehr, Jr.

[57] ABSTRACT

A quick release mechanism for a girth band having a plurality of coupling portions with high lead angle threaded surfaces that engage and automatically unscrew when tension is applied to the girth band unless an arm disposed on one of the coupling portions is prevented from rotating with respect to the other coupling portions.

7 Claims, 5 Drawing Figures

QUICK RELEASE GIRTH BAND

GOVERNMENT CONTRACT CLAUSE

The Government has rights in this invention pursuant to Contract No. RHO-11020 between Westinghouse Electric Corporation and the Department of Defense.

The invention described herein was made in the performance of work under a U.S. Government Contract with the Department of Defense.

BACKGROUND OF THE INVENTION

This invention relates to a quick release mechanism and more particularly to a quick release mechanism for a girth band.

Missiles disposed in canisters have pads, which space the missile from the canister and provide lateral support for the missile in the canister. If the canister is to have a clean bore, the pad must be releasably attached to the missile. The release mechanism must be simple, reliable, small and light.

The girth bands or circumferential cables are tensioned around the missile holding the pads against the outer cylindrical surface of the missile while it is in the canister, however, as the missile exits from the canister the girth bands must separate allowing the pads to separate from the missile as it emerges from the canister.

SUMMARY OF THE INVENTION

In general, a quick release girth band, when made in accordance with this invention, comprises a girth band, and a plurality of coupling portions. The girth band has one of the coupling portions connected to each end thereof. The quick release girth band also comprises an arm cooperatively associated with at least one of the coupling portions. The coupling portions are engaged in a latched relationship when the arm is in one position and the couplings are disengagable when the arm is in another position so that tensioning the girth band causes the coupling portions to disengage.

BRIEF DESCRIPTION OF THE DRAWINGS

The objects and advantages of this invention will become more apparent from reading the following detailed description in conjunction with the drawings, in which:

FIG. 3 is a sectional view taken on line III—III of FIG. 2;

DESCRIPTION OF THE PREFERRED EMBODIMENT

Figure 1:
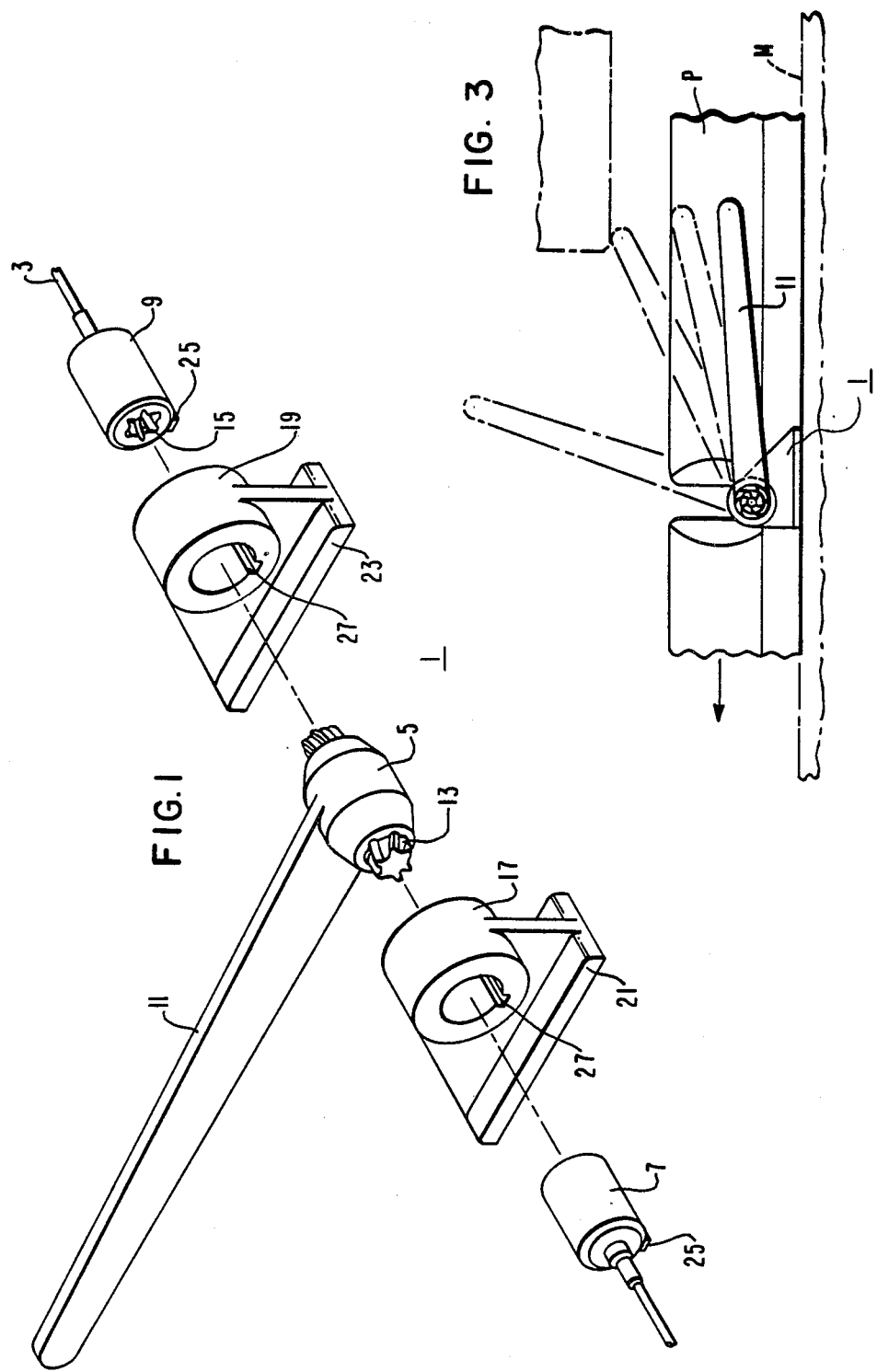
FIG. 1 is an exploded perspective view of a quick release mechanism and a portion of a girth band made in accordance with this invention.
Figure 2:
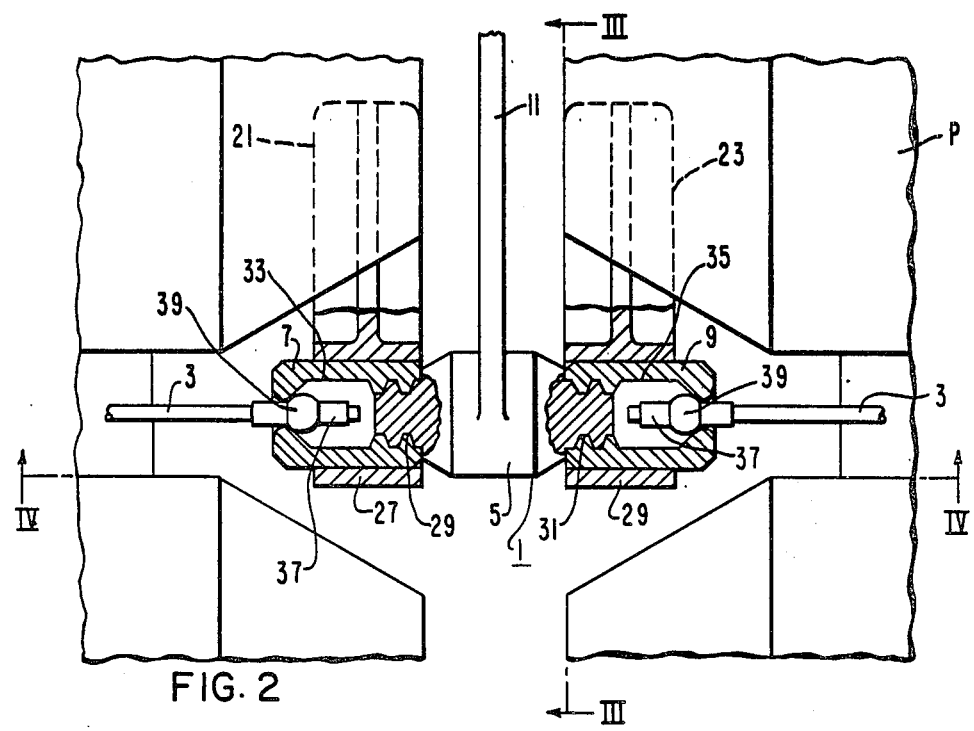
FIG. 2 is a plan view of the quick release mechanism.

Referring now to the drawings in detail and in particular to FIG. 1 there is shown a quick release mechanism 1 for a girth band or circumferential cable 3 which fastens shock pads P to the outer surface of a missile M. The release mechanism 1 comprises a plurality of coupling portions 5, 7 and 9, at least one of the coupling portions 5 has an arm 11 cooperatively associated therewith or affixed thereto. The coupling portions 5, 7 and 9 have engaging male and female threads 13 and 15 respectively with high lead angles. The angle is such that when measured perpendicularly to the girth band's axis the angle is greater than the arc tangent of the mating thread's surfaces coefficient of friction, whereby tension in the girth band 3 results in automatic unscrewing of the mating threads 13 and 15 rotation of the arm 11. The coupling portions 7 and 9 are slidably disposed in bushings 17 and 19, respectively, which have bases 21 and 23 that engage the missile and prevent rotation of the bushings 17 and 19. The bushings 17 and 19 and coupling portions 7 and 9, as shown in FIG. 1 have keys 25 and keyways 27 which allow the coupling portions 7 and 9 to slide axially within the bushings 17 and 19 and prevent rotation therebetween. The coupling portions 7 and 9 as shown in FIG. 2 have central bores 29 and 31, respectively, extending through the coupling portions and enlarged bore portions 33 and 35, respectively, which receive and retain enlarged cable ends 37. The cable ends 37 are swaged on the ends of the cable 3 and have a ball or spherical portion 39 which fits into and is retained in the enlarged bore portions 33 and 35.

Figure 4:
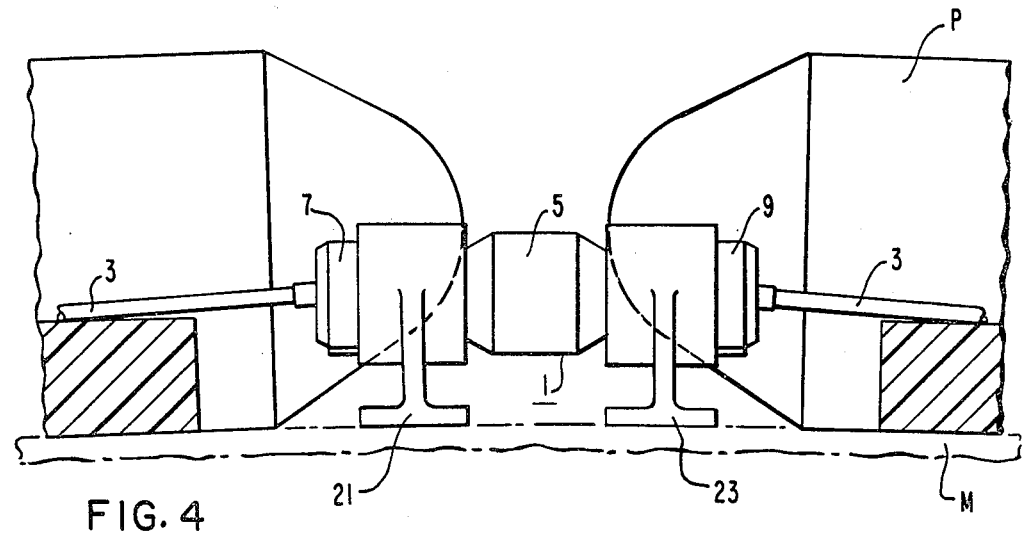
FIG. 4 is a sectional view taken on line IV—IV of FIG. 2.
Figure 2:
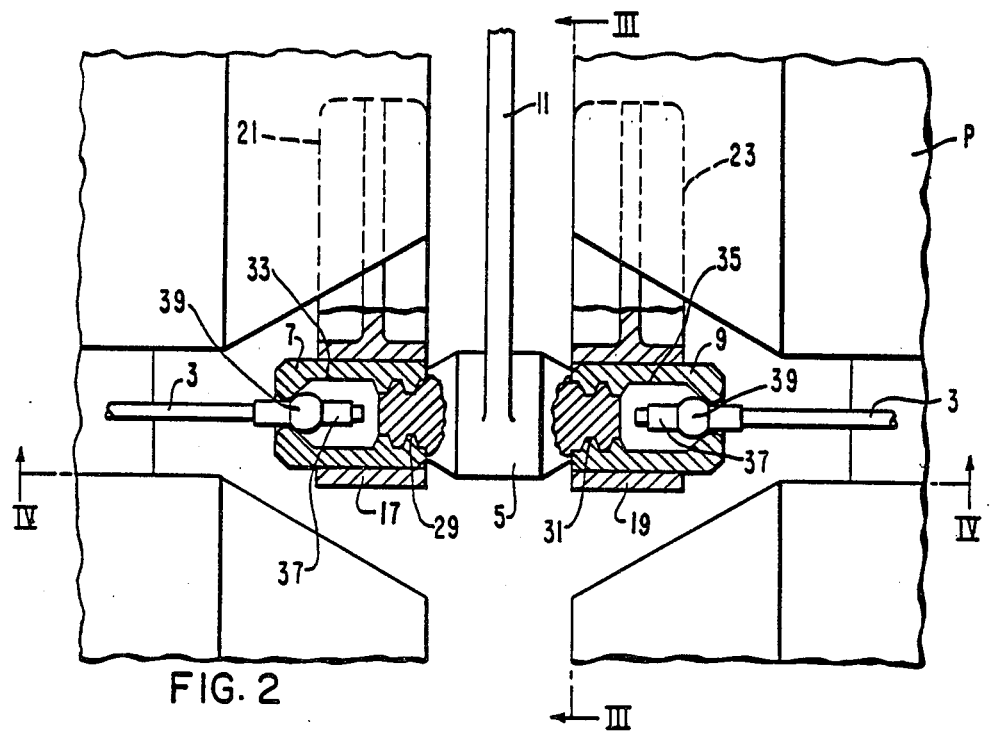
Figure 5:
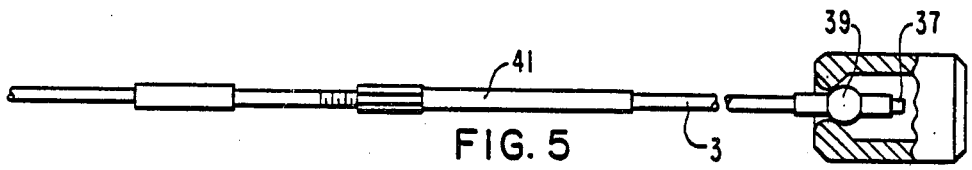
Figure 4:
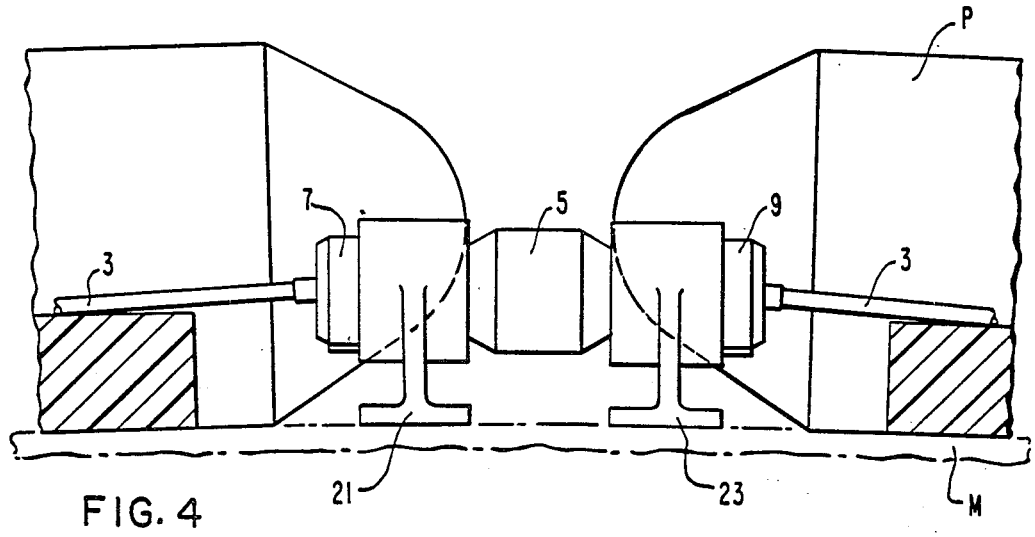

As shown in FIGS. 1, 2 and 4 the coupling portion 5 has an arm 11 and threads on both ends of the coupling portion which engage female threads into coupling portions 7 and 9. This is the preferred embodiment doubling the number of engaging surfaces to ensure separation of the couplings, however, it is understood that this invention encompasses an embodiment in which the coupling portion 5 would have a single male thread and the cable 3 would be attached to the other end of the coupling portion 5.

FIG. 3 shows the movement of the arm 11 from the engaged position to a position wherein the coupling portions 5, 7 and 9 would disengage.

Figure 5:
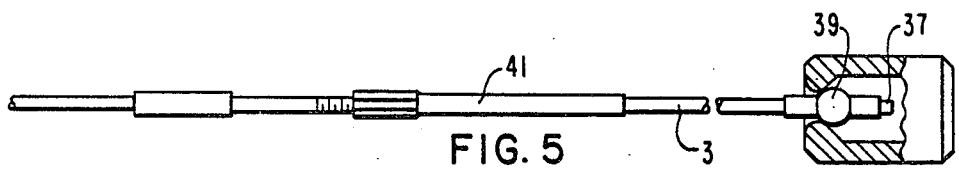
FIG. 5 is a view of a turnbuckle utilized to tension the girth band.

FIG. 5 shows a turnbuckle 41 or other means which is disposed in the cable or girth band to tension the same. It is understood that an elastic member or other tensioning means could be utilized to provide the necessary tension to cause the automatic rotation of the arm 11 and disengagement of the coupling portions 5, 7 and 9 thus releasing the girth band of circumferential cable.

What is claimed is:

1. A quick release mechanism for a girth band comprising a girth band, a plurality of coupling portions, said girth band having one of said coupling portions connected to each end thereof, an arm cooperatively associated with at least one of said coupling portions, said coupling portions being engaged in a latched relationship when said arm is in one position and said couplings being disengagable when said arm is in another position, means for tensioning said girth band and said engagement being such that the tensioned girth band tends to cause said arm to move away from the position wherein the coupling portions are latched.

2. A quick release mechanism as set forth in claim 1 wherein the girth band has expanded ends and the coupling portions connected thereto have a bore, a portion of which is enlarged and the girth band fits thorugh the bore while the expanded ends do not fit therethrough but are retained within the enlarged portion of the bore.

3. A quick release mechanism as set forth in claim 2, wherein mating coupling portions have engaging threads with sufficiently large lead angles so that said arm is biased to the position wherein the coupling portions are unlatchable by a girth band that is elastically stretched.

4. A quick release mechanism as set forth in claim 3, wherein coupling portions other than the one having an arm cooperatively associated therewith have means cooperatively associated therewith to prevent rotation with respect to that which the girth band encircles.

5. A quick release mechanism as set forth in claim 2, wherein mating coupling portions have cooperatively inclined surfaces which cooperate with the tension in the girth band to unlatch when the arm is not retained.

6. A quick release mechanism as set forth in claim 1, wherein said girth band is elastically stretched when said couplings are in a latched relationship whereby they will automatically disengage when said arm is moved to the other position.

7. A quick release mechanism as set forth in claim 1, wherein said engaged portions of said coupling portions comprise mating surfaces disposed on an angle which when measured perpendicularly to the girth band axis is greater than the arc tangent of the mating surface's coefficient of friction.

* * * * *